(12) United States Patent
Patwardhan et al.

(10) Patent No.: US 11,582,673 B2
(45) Date of Patent: Feb. 14, 2023

(54) MANAGING CLIENT DEVICES ON ACCESS POINTS

(71) Applicant: HEWLETT PACKARD ENTERPRISE DEVELOPMENT LP, Houston, TX (US)

(72) Inventors: Gaurav Patwardhan, Santa Clara, CA (US); Sachin Ganu, Santa Clara, CA (US); Shruthi Koundinya, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 193 days.

(21) Appl. No.: 17/171,833

(22) Filed: Feb. 9, 2021

(65) Prior Publication Data
US 2022/0256430 A1 Aug. 11, 2022

(51) Int. Cl.
*H04W 36/38* (2009.01)
*H04W 76/38* (2018.01)
*H04W 36/08* (2009.01)

(52) U.S. Cl.
CPC ........... *H04W 36/38* (2013.01); *H04W 36/08* (2013.01); *H04W 76/38* (2018.02)

(58) Field of Classification Search
CPC ..... H04W 36/38; H04W 76/38; H04W 36/08; H04W 76/40
See application file for complete search history.

(56) References Cited

U.S. PATENT DOCUMENTS

| 8,315,163 | B2 | 11/2012 | Xu |
| 9,497,635 | B2 | 11/2016 | Park et al. |
| 2016/0007247 | A1 | 1/2016 | Lee et al. |
| 2017/0374602 | A1* | 12/2017 | Gokturk ................. H04L 45/125 |
| 2018/0288664 | A1* | 10/2018 | Ouzieli ................. H04W 36/08 |
| 2019/0037460 | A1* | 1/2019 | Bhattacharya .... H04W 72/0426 |

OTHER PUBLICATIONS

CISCO, Meraki Auto RF: Wi-Fi Channel and Power Management, (Research Paper), Jun. 8, 2020, 14 Pgs., CISCO.
Vanhoef, M. et al., Operating Channel Validation: Preventing Multi-Channel Man-in-the-Middle Attacks Against Protected Wi-Fi Networks, (Research Paper), WiSec'18: Proceedings of the 11th ACM Conference on Security & Privacy in Wireless and Mobile Networks, Jun. 18-20, 2018, pp. 34-39, AMC, Stockholm, Sweden.
Zubow, A. et al., BIGAP—Seamless Handover in High Performance Enterprise IEEE 802.11 Networks, (Research Paper), NOMS 2016—2016 IEEE/IFIP Network Operations and Management Symposium, Apr. 25-29, 2016, 8 Pgs., IEEE.

\* cited by examiner

*Primary Examiner* — Chi H Pham
*Assistant Examiner* — Ji-Hae Yea
(74) *Attorney, Agent, or Firm* — Sheppard Mullin Richter & Hampton LLP

(57) ABSTRACT

An access point configured to manage client devices connected to the access point. The access point initiates an operational change. The access point generates an announcement to be included in a network frame based on the operational change. The announcement includes at least a list of neighboring access points with which the client devices can connect to and a first time period by which the client devices must connect to at least one neighboring access point included in the list of neighboring access points. The access point broadcasts the network frame to the client devices. Upon expiration of the first time period, the access point disassociates client devices that remain connected to the access point.

20 Claims, 6 Drawing Sheets

Computing Component 400

Hardware Processor(s) 402

Machine-Readable Storage Media 404

Initiate an operational change of an access point.
406

Generate an announcement to be included in a network frame based on the operational change. The announcement includes a list of neighboring access points with which client devices connected to the access point can connect to and a first time period by which the client devices must connect to a neighboring access point.
408

Broadcast the network frame to the client devices.
410

Disassociate, upon expiration of the time period, client devices that remain connected to the access point.
412

FIG. 4

MANAGING CLIENT DEVICES ON ACCESS POINTS

DESCRIPTION OF RELATED ART

Access points allow client devices to wirelessly connect to a network. The access points provide a plurality of wireless channels on which the client devices may transmit network data to and/or receive network data from the network. The access points may instruct the client devices to transmit and/or receive network data on particular wireless channels of the plurality of wireless channels.

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments.

FIG. 4 illustrates a set of machine-readable/machine-executable instructions that, when executed, cause one or more hardware processors to perform an illustrative method for managing client devices on access points in accordance with various embodiments of the present disclosure.

Figure 1:
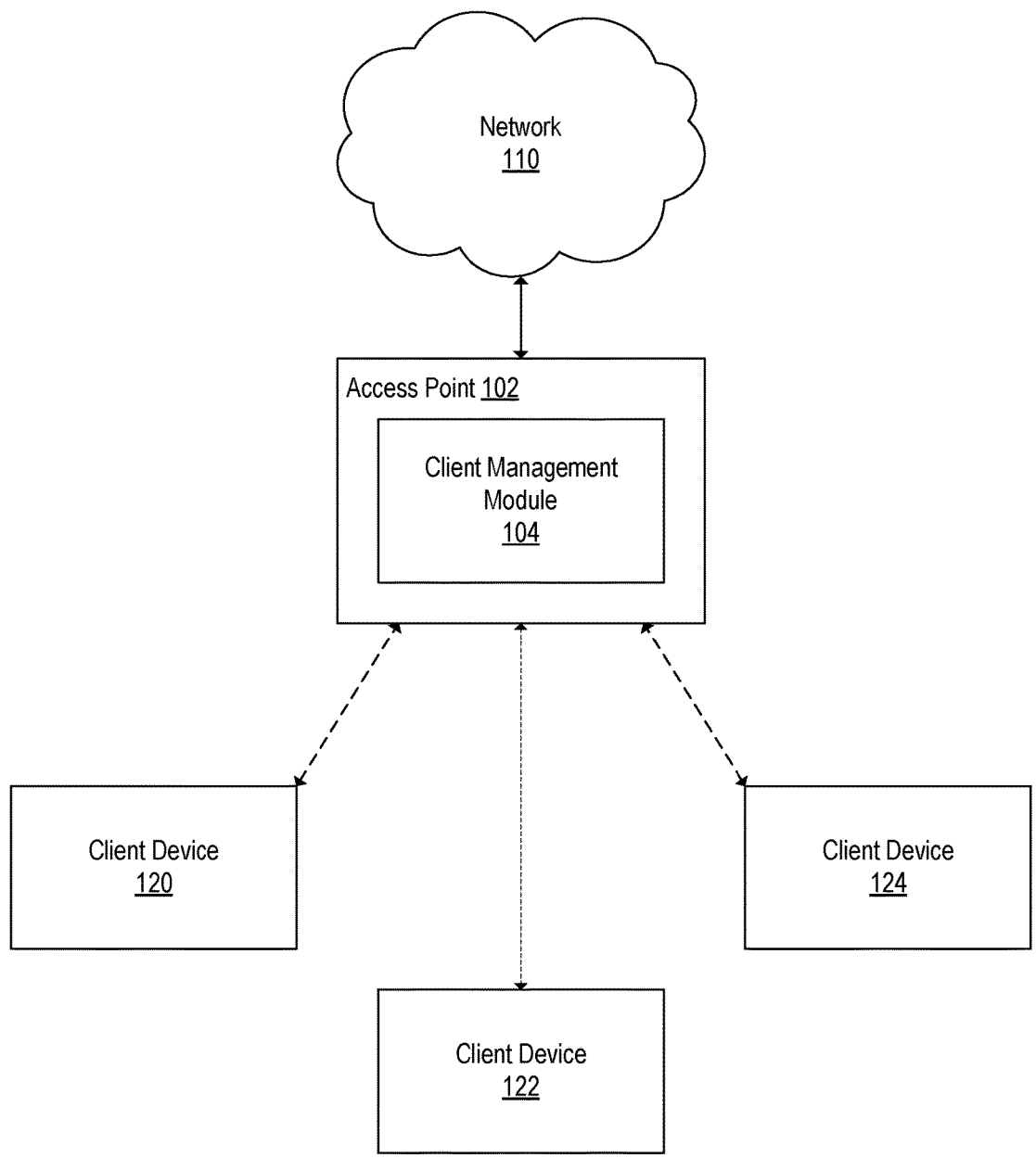
FIG. 1 illustrates an example network architecture in accordance with various embodiments of the present disclosure.

The figures are not exhaustive and do not limit the present disclosure to the precise form disclosed.

DETAILED DESCRIPTION

Client devices can wirelessly access a network through access points. An access point may change its operational state. For example, an access point may detect radio frequency (RF) interferences on its operating wireless channel. In this example, the access point may instruct client devices connected to that particular wireless channel to connect to another wireless channel provided by the access point or its neighbor that does not suffer from the RF interferences. As another example, an access point may be instructed to deactivate (e.g., turn off) wireless channels to save energy or, in some cases, to reduce a wireless coverage of a network (e.g., a wireless footprint). In this example, the access point may instruct client devices currently connected to the access point to connect to other neighboring access points. In general, whenever an access point changes an operational state, it can cause interruptions or disruptions to client devices connected to the access point. Often times, the client devices would lose network connections as the access point changes the operational state, and thereby disrupting network-related computing tasks currently being executed on the client devices. For example, a user operating a client device may be conducting a video conference, a voice-over-internet protocol (VOIP) call, or streaming video while an access point to which the client device is connected changes an operational state. In this example, the client device may experience dropped video frames or dropped voice snippets as result. In more severe cases, the video conference, the VOIP call, or the video streaming may be dropped altogether. In some cases, when client devices try to reconnect to an access point after being dropped by the access point, the client device may place a service set identifier provided by the access point in a "deny list," thereby prohibiting the client devices from reconnecting to the access point. As such, anytime when an access point changes an operational state, it can cause various interruptions or disruptions to client devices connected to the access point.

Described herein is a solution that addresses the problems described above. Various embodiments described herein provide a systematic way of managing client devices on access points. An access point can be coupled to a network. In some embodiments, the network can be the internet. In some cases, the network can be an enterprise network. The access point, in some embodiments, can provide a plurality of wireless channels on which client devices can connect and access the network. The access point may change an operational state. This operational change may be planned or unplanned. A planned operational change occurs when the access point is instructed by a network management entity to change an operational state. This can occur when, for example, the network management entity determines that the access point no longer needs to in operation and instructs the access point to be deactivated or shut off. An unplanned operational change occurs when the access point, itself, changes an operational state. This can occur when, for example, the access point detects RF interferences on particular wireless channels and instructs client devices currently connected to those particular wireless channels to connect to other wireless channels provided by the access point or connect to wireless channels of other access points. Depending on whether an operational change is planned or unplanned, the access point can be configured to execute a series of instructions that ensures client devices connected to the access point not to experience interruptions or disruptions as the access point changes an operational state. For example, if an operational change of an access point is unplanned, the access point can broadcast a channel switch announcement to client devices connected to the access point, thereby allowing the client devices to take actions prior to the operational change. On the other hand, if an operational change of an access point is planned, the access point can execute a systematic way of disassociating client devices connected to the access point before the operational change takes effect. In this way, the client devices will not be impacted as the access point executes the operational change. These and other features of the embodiments are discussed herein.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example network architecture 100 in accordance with various embodiments of the present disclosure. As shown in FIG. 1, in some embodiments, the network architecture 100 can include an access point 102 communicatively coupled to a network 110. The access point 102 can be coupled to the network 110 through various physical linked layers. For example, in some embodiments, the access point 102 may be coupled to the network 110 though an ethernet connection (e.g., IEEE 802.3). In other embodiments, the access point 102 may be coupled to the network 110 through a Wi-Fi (e.g., IEEE 802.11), Bluetooth (e.g., IEEE 802.15.1), or over a cellular connection (e.g., long-term evolution, 5th generation cellular networks, etc.). Many variations are possible. In some embodiments, the network architecture 100 can further include client devices 120-124 (stations or "STAB") that can be configured to wirelessly access the network 110 through the access point 102. For example, in some embodiments, the network 110 can be the internet and the client devices 120-124 can be computing devices, such as computers, mobile phones, tablet devices, etc. In this example, the client devices 120-124 can access the internet, wirelessly, through the access point 102. In some embodiments, the network 110 can be an enterprise intranet (e.g., a private network) and the client devices 120-124 can access data files or other enterprise data, wirelessly, through the access point 102. In general, the access point 102 can be considered as a node of the network 110 and the access point 102 can be configured in a plurality of operational states or modes to perform various functions for the network 110. For example, as discussed, the access point 102 can be configured as an access point (e.g., an access point mode) to allow the client devices 120-124 to wirelessly access the network 110. In some cases, the access point 102 can be configured as a bridge (e.g., a bridge mode) that allows the access point 102 to communicate with other access points of the network 110. In some cases, the access point 102 can be configured as a repeater (e.g., a repeater mode) to extend a wireless range of the network 110. In some cases, the access point 102 can be configured as an air monitor (e.g., an air monitor mode) to analyze all available wireless channels, detect any unauthorized client connections to the wireless channels, and disable the unauthorized client connections from accessing the network 110. Many variations are possible.

In some embodiments, the access point 102 can include a client management module 104. The client management module 104 can be configured to perform various functions associated with the access point 102 when the access point 102 is configured as an access point. The client management module 104, in some embodiments, can be configured to manage network connections between the access point 102 and the client devices 120-124 as the access point 102 changes an operational state. The client management module 104 can ensure that the client devices 120-124 remain connected to the network 110 while the access point executes the operational change. In some embodiments, the client management module 104 can provide instructions to the client devices 120-124 to connect to particular wireless channels provided by the access point 102. In some cases, the client management module 104 can provide instructions to the client devices 120-124 to connect to wireless channels of neighboring access points. In some embodiments, the client management module 102 can be configured to provide instructions to disassociate the client devices 120-124 based on wireless protocols associated with the client devices 120-124. For example, the client device 120 may support a particular wireless protocol (e.g., IEEE 802.11v) while the client devices 122 and 124 do not. In this example, the client management module 104 may disassociate the client device 120 differently than client devices 122 and 124. These and other features of the client management module 104 will be discussed in further detail with reference to FIG. 2 herein.

Figure 2:
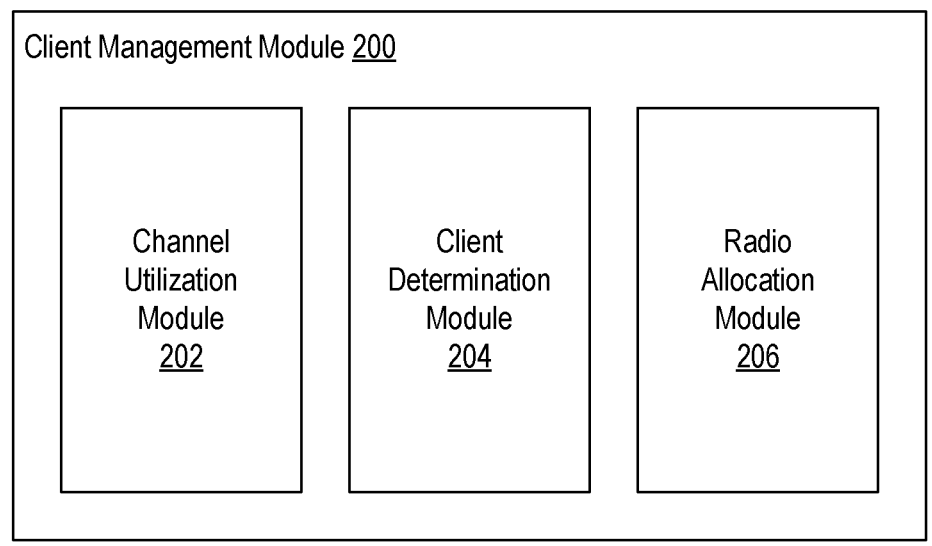
FIG. 2 illustrates an example client management module in accordance with various embodiments of the present disclosure.

FIG. 2 illustrates an example client management module 200 in accordance with various embodiments of the present disclosure. In some embodiments, the client management module 104 of FIG. 1 can be implemented as the client management module 200. As discussed with respect to FIG. 1 above, the client management module 200 can perform various functions associated with an access point (e.g., the access point 102 of FIG. 1). As shown in FIG. 2, in some embodiments, the client management module 200 can include a channel utilization module 202, a client determination module 204, and a radio allocation module 206. Each of these modules will be discussed in further detail herein.

In some embodiments, the channel utilization module 202 can be configured to determine utilization of wireless channels provided by an access point. An utilization of a wireless channel can refer to, in part, a number of client devices connected to the wireless channel. For example, the channel utilization module 202 can determine that two client devices are connect to a first wireless channel and four client devices are connected to a second wireless channel provided by an access point. In some embodiments, the channel utilization module 202 can determine utilization of wireless channels upon an initial bootup (e.g., startup or power-up) of the access point. In some cases, the channel utilization module 202 can determine utilization of wireless channels periodically or at a predetermined time frame. For example, the channel utilization module 202 can determine utilization of wireless channels every 10 minutes, 30 minutes, 60 minutes, etc. In some cases, a frequency at which the channel utilization module 202 can determine utilization of wireless channels can be user configurable. For example, the channel utilization module 202 can be configured by a network management entity to determine utilization of wireless channels every 5 minutes, 10 minutes, 30 minutes, etc. In some cases, a frequency at which the channel utilization module 202 can determine utilization of wireless channels can be set to a default frequency. For example, the channel utilization module 202 can be defaulted to determine utilization of wireless channels every hour. In general, wireless channels provided by an access point refer to operational frequencies to which client devices can communicate with the access point. For example, in some embodiments, an access point operating in 2.4 GHz can provide 11 wireless channels. In this example, wireless channel 1 corresponds to an operational frequency range between 2413 to 2423 MHz with a center frequency of 2412 MHz. As another example, wireless channel 10 corresponds to an operational frequency range between 2446 to 2468 MHz with a center frequency of 2457 MHz.

In some embodiments, the channel utilization module 202 can determine an interference associated with wireless channels provided by the access point. In general, wireless channels provided by the access point can operate in 2.4 GHz and 5 GHz radio frequency (RF) ranges. Because a number of devices, such as microwave ovens, wireless land-line telephones, etc., can emit RF waves (or signals) in the 2.4 GHz range, wireless channels provided by the access point that operate in the 2.4 GHz range can suffer from interferences from these devices. For example, a client device (e.g., one of the client devices 120-124) may be connected to a wireless channel that operates in the 2.4 GHz range. In this example, if a microwave oven emits RF waves that overlap the wireless channel, the RF waves can cause an interference and interfere with the client device's connection to the access point. Similarly, wireless channels that operate in the 5 GHz can also suffer from interferences cause by devices. For example, an operation of a radar device can cause interferences in wireless channels that operate in the 5 GHz range. Interference from 802.11 capable devices operating in 2.4 GHz and 5 GHz will also contribute to the overall interference. As such, the channel utilization module 202 can determine channel qualities of wireless channels based on interferences associated with the wireless channels. In some embodiments, the channel utilization module 202 can quantify an interference on a wireless channel based on a noise floor associated with the wireless channel. For example, higher the noise floor, more severe the interference. In some embodiments, the channel utilization module 202 can identify wireless channels that are free or relatively free from interferences based on their respective noise floors and provide this information to other modules of the client management module 200 for further assessment.

In some embodiments, the client determination module 204 can determine types of client devices connected to wireless channels provided by an access point. The client determination module 204 can determine a type of a client device connected to a wireless channel based on a wireless protocol associated with the client device. For example, a first client device with a radio chip set that supports IEEE 802.11ac wireless protocol is connected to a first wireless channel and a second client device with a radio chip set that supports IEEE 802.11n wireless protocol is connected to a second wireless channel. In this example, the client determination module 204 can identify a type of the first client device and a type of the second client device as IEEE 802.11ac and IEEE 802.11n, respectively. In some embodiments, the client determination module 204 can determine a type of a client device connected to a wireless channel based on a media access control (MAC) address of the client device. For example, a first client device has a MAC address of aa:bb:cc:dd:ee:ff and a second client device has a MAC address of 11:22:33:44:55:66. In this example, the client determination module 204 can identify a type of the first client device and a type of the second client device as aa:bb:cc:dd:ee:ff and 11:22:33:44:55:66, respectively. Many variations are possible.

In some embodiments, the radio allocation module 206 can be configured to allocate or assign client devices to wireless channels provided by a radio of an access point based on channel qualities of the wireless channels. The radio allocation module 206 can assign a client device to a particular wireless channel provided by a radio based on interferences. For example, the channel utilization module 202 can provide interference information associated with each wireless channel provided by radios of an access point to the radio allocation module 206. In this example, the radio allocation module 206 can assign client devices to wireless channels that have interferences below a certain interference level (e.g., a threshold level) or noise floor. In some embodiments, the radio allocation module 206 can assign client devices from one access point to wireless channels provided by radios of other access points. For example, when all or some of the wireless channels provided by radios of an access point experience interferences above a certain threshold level or noise floor, the radio allocation module 206 can assign client devices to wireless channels provided by radios of other access points that do not suffer from the interferences or have interferences below the threshold level.

In some embodiments, the radio allocation module 206 can assign client devices to wireless channels based on types of client devices. For example, the client determination module 204 can provide information relating to types of client devices associated with wireless channels provided by an access point to the radio allocation module 206. In this example, the radio allocation module 206 can assign client devices to particular wireless channels based on types of the client devices. For instance, the radio allocation module 206 can allocate client devices that support IEEE 802.11ac wireless protocol to one wireless channel and client devices that support IEEE 802.11n wireless protocol to another wireless channel.

In some embodiments, when the radio allocation module 206 assigns a client device to a wireless channel, the radio allocation module 206 can generate and broadcast a channel switch announcement (CSA) to the client device. Embedded in the CSA is information indicating a newly assigned wireless channel provided by a radio of a neighboring access point to which the client device should connect to and a time period by which the client device must connect to the newly assigned wireless channel. If the client device does not connect to the newly assigned wireless channel within that time period, the client device can no longer access the network through the access point, at which point the client device is disassociated from the access point. In some embodiments, the radio allocation module 206 can be configured to authenticate or deauthenticate client devices associated with an access point. For example, the radio allocation module 206 can be configured to allow only authenticated client devices to connect to the access point. In this example, only the authenticated client devices can access the network.

In some embodiments, the radio allocation module 206 can utilize CSAs to "nudge" client devices connected to an access point to connect to a different neighboring access point. For example, in general, a CSA can be broadcasted (e.g., beaconed) by an access point when access point wants to transition client devices from noisy wireless channels to other non-noisy wireless channels for better network performance. In this example, instead of using CSAs for this particular purpose, the radio allocation module 206 can generate and broadcast a CSA to "nudge" or encourage the client devices to connect to other neighboring access points so that an operational change can take effect on the access point.

Figure 3A:
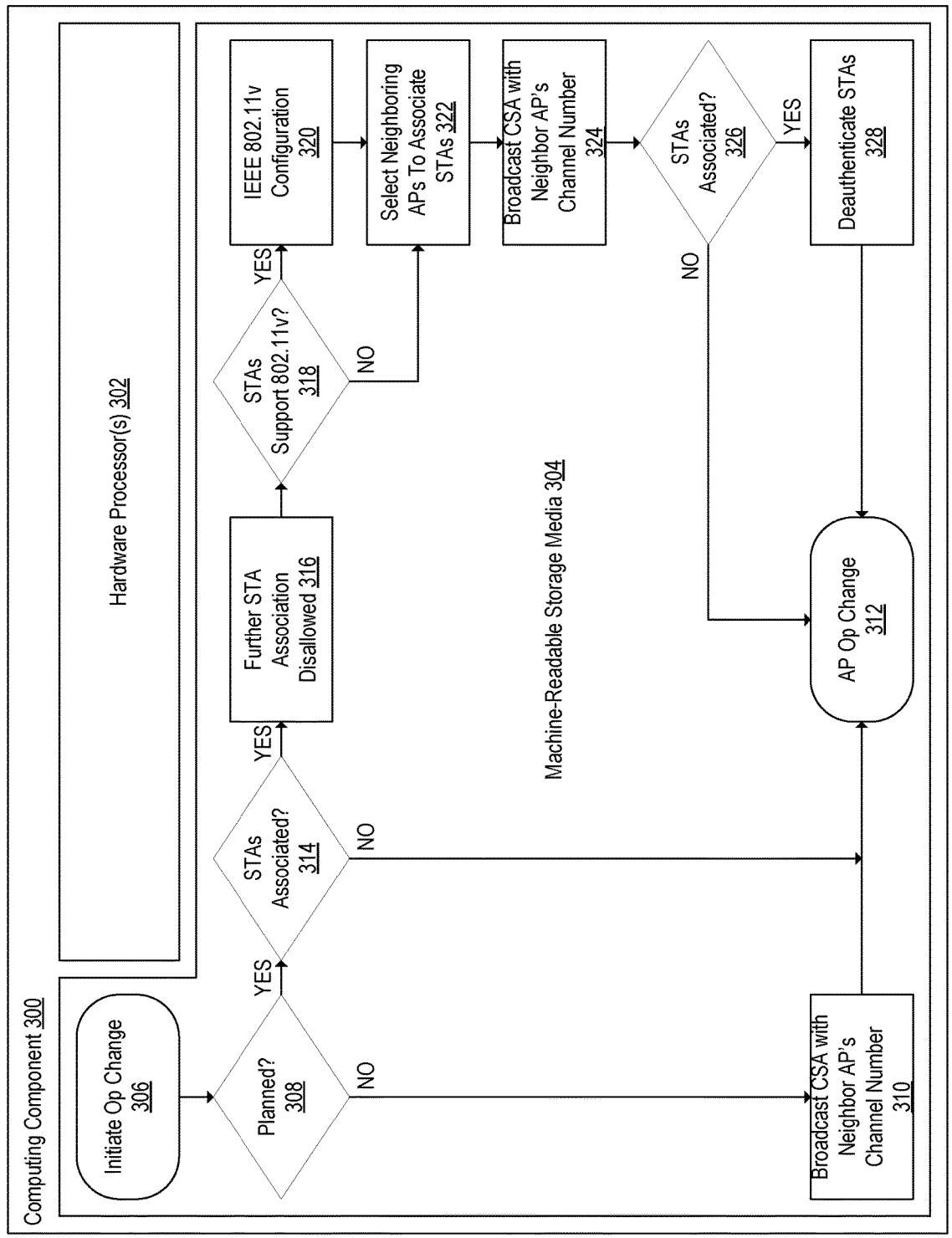
FIG. 3A illustrates an example computing component that can be configured to perform an operation to disassociate client devices from an access point in accordance with various embodiments of the present disclosure.

FIG. 3A illustrates an example computing component 300 that can be configured to perform an operation to disassociate client devices from an access point in accordance with various embodiments of the present disclosure. In some embodiments, the computing component 300 can comprise at least one hardware processor 302 and machine readable storage media 304 storing a set of machine-readable/machine-executable instructions, that when executed by the hardware processor 302, causes the computing component 300 to perform the operation to disassociate client devices from an access point. The set of machine-readable/machine-executable instructions at block 306. At block 306, the access point can initiate an operational change. The operational change can be planned or unplanned. For example, when a network management entity instructs an access point to change an operational state, the operational change is a planned change. Whereas, if the access point changes an operational state by itself, the operational change is an unplanned change. A planned operational change can occur when a network management entity wants to move client devices on a particular wireless channel of an access point to a different wireless channel of the access point or to a wireless channel of a different access point. In some cases, a planned operational change of an access point can occur when a network management entity wants to shut down the access point to conserve energy (e.g., "green" access points) or to reduce wireless coverage of a network. Such planned operational change can occur, for example, during off-business hours when some access points need not be in operation. As another example, access points associated with a venue (e.g., a stadium) can be shut down absent activities (e.g., live sports) to conserve energy and to provide better network security by limiting access. In some cases, a planned operational change of an access point can occur when a network management entity wants to configure the access point from an access point mode (e.g., an AP mode) to an air monitor mode (e.g., an AM mode). When an access point is configured in an AM mode, the access point can analyze all available wireless channels, detect any unauthorized client connections to the wireless channels, and disable the unauthorized client connections from accessing network. Many variation are possible.

An unplanned operational change of an access point can occur when the access point changes its operational state without instructions from a network management entity or by itself. Such unplanned operational change can occur when the access point is configured for dynamic frequency selection (DFS). Under DFS, an access point can move or transition client devices connected to the access point from one wireless channel to another wireless channel for better network performance. For example, a first wireless channel of an access point may experience radio frequency (RF) interferences from neighboring devices such from a microwave oven or a radar device. In this example, the access point may instruct client devices on the first wireless channel to connect to another wireless channel that does not suffer from the RF interference. In some cases, an access point may move or transition client devices from one wireless channel to another wireless channel that is less crowded. For example, there can be a plurality of access points of different networks operating in an area (e.g., a high-rise or apartment building). In this example, client devices connected to the plurality of access points may be transmitting and receiving network data on same wireless channel (e.g., same wireless frequency), thereby causing various interferences. In this example, some of the plurality of access points may instruct their client devices to move or transition to different wireless channels, thus improving network performance. In some cases, an unplanned operational change of an access point may occur in response to an event. For example, an access point may detect an unauthorized client connection to the access point. In this example, the access point may deactivate itself (e.g., power off) to halt the unauthorized client connection. Many variations are possible.

Referring back to FIG. 3A, at block 306, the access point can determine whether an operational change is planned or unplanned. As discussed above, a planned operational change can occur when an network management entity instructs an operational change and an unplanned operational change can occur when the access point, itself, decides an operational change. If the operational change determined to be unplanned (e.g., "NO" branch), the access point, at block 310, can generate and broadcast a management frame (e.g., a beacon frame) that includes a channel switch announcement (CSA) to notify any client devices connected to the access point, the access point's intention of changing its operational state (e.g. the access point deactivating itself from service). Embedded in the CSA is information indicating a new channel number field broadcast that is populated with an operating channel number of a neighboring access point to which the client devices can connect to and a time period by which the client devices must transition to the neighboring access point. In some embodiments, the time period by which the client devices must transition to the neighboring access point can be indicated by a number of subsequent management frames. In response to receiving the management frames including the CSA, the client devices can transition, whenever appropriate, to the neighboring access point specified in the CSA within a certain number of subsequent management frames. In some embodiments, the number of subsequent management frames after which the client devices must transition to the neighboring access point is user configurable. For example, an access point can be configured such that client devices connected to the access point must transition to a neighboring access point specified in a CSA within four subsequent management frames after receiving a management frame including the CSA. As another example, an access point can be configured such that client devices connected to the access point must transition to a neighboring access point specified in a CSA within eight subsequent management frames after receiving a management frame including the CSA. Many variations are possible.

At block 312, after the time period by which the client devices must transition to the neighboring access point expires, the access point can proceed with the operational change. At this time, any remaining client devices that are still connected to the access point and that did not transition to the neighboring access point are deauthenticated by the access point from accessing the network.

If the access point, at block 308, determines that the operational change is planned (e.g., a planned shutdown of the access point to reduce power consumption), the access point, at block 314, can determine whether there are client devices (e.g., stations or "STAs") connected to or associated with the access point. If no client devices are connected to the access point (e.g., "NO" branch), the access point can proceed with the operational change at block 308, as discussed above. However, if the access point determines that there are client devices connected to the access point (e.g., "YES" branch), the access point then prevents any additional client devices from connecting to the access point, at block 316 (e.g., "Further STA Association Disallowed"). In this way, the additional client devices can seek network connections through other access points instead of the access point planning for the operational change.

At block 318, after the access point determines that there are client devices connected to itself, the access point then proceeds to identify client devices that support a particular communication protocol (e.g., IEEE 802.11v or "802.11v") from the client devices currently connected to the access point. If some client devices are identified to support the particular communication protocol, the access point then configures those client devices separately and differently from client devices that do not support the particular communication protocol, at block 320. Block 320 will be discussed in further detail with reference to FIG. 3B herein.

At block 322, the access point determines, from a list of neighboring access points stored in a data store (e.g., an electrically erasable programmable read-only memory or EEPROM) associated with the access point, one or more neighboring access points to which the client devices currently connected to the access point can connect. Information relating to the one or more neighboring access points can be included in a CSA to be broadcasted by the access point in management frames, at block 324. As discussed above, the access point can broadcast the CSA as part of a management frame or a beacon frame to the client devices. As discussed above, also included in the CSA, is a new channel number field broadcast that is populated with an operating channel number of a neighboring access point to which the client devices can connect to and a time period by which the client devices must transition to the one or more neighboring access points.

At block 326, the access point waits to see if the client devices connected to the access point have associated with the one or more neighboring access points specified in the CSA within the time period. Upon expiration of the time period by which the client devices must transition, the access point determines whether the client devices are still connected to the access point. If any client devices remain connected to or associated with the access point (e.g., "YES" branch), the access point can deauthenticate these client devices and prevent these client devices from accessing the network through the access point, at block 328. The access point then proceeds with operational change as discussed above, at block 312. If the client devices are no longer connected to or associated with the access point upon expiration of the time period (e.g., "NO" branch), this means that the client devices have transitioned to the one or more neighboring access points within the time period and the access point proceeds with the operational change, at block 312.

Figure 3B:
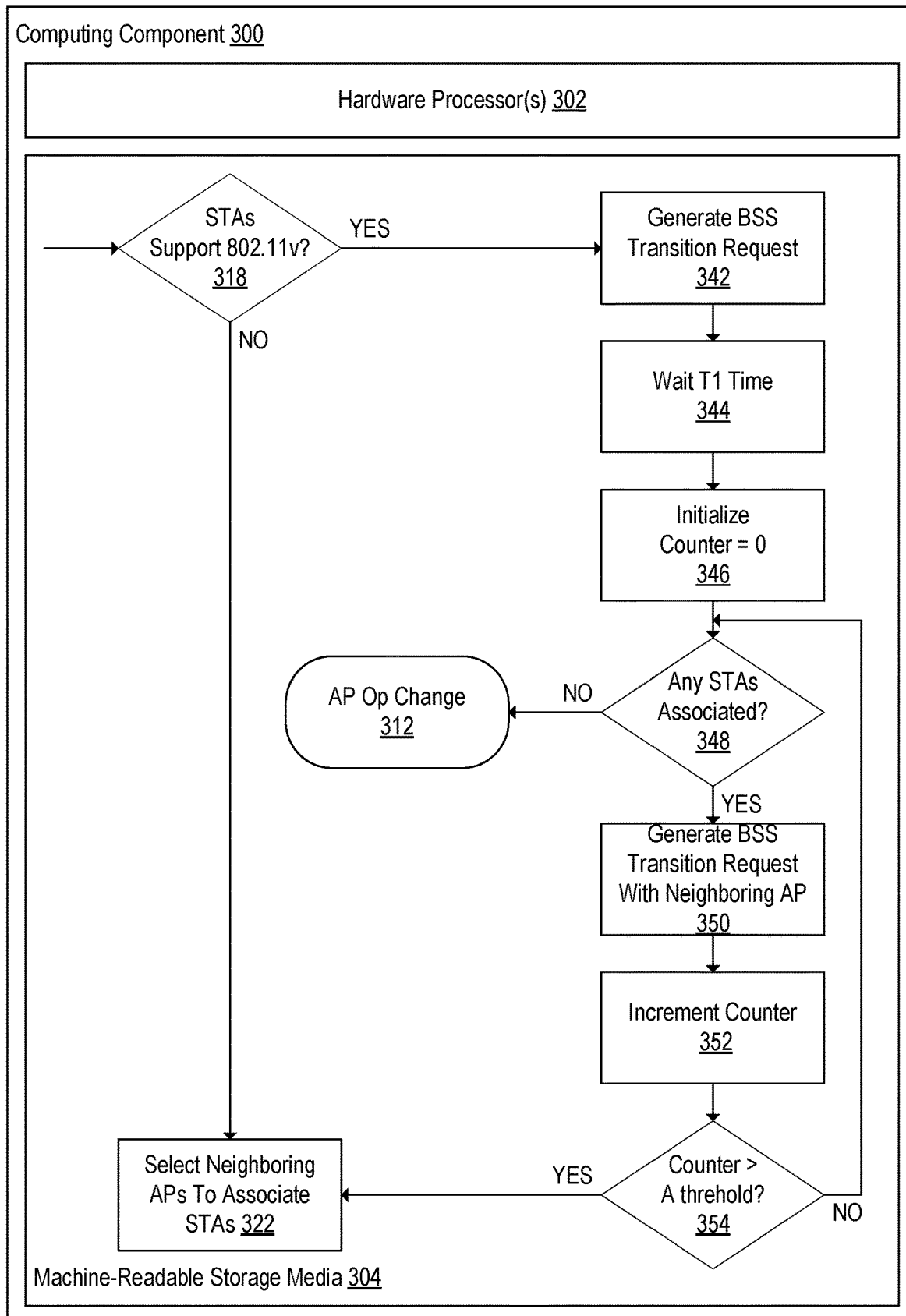
FIG. 3B illustrates an example computing component that can be configured to perform an operation to disassociate client devices supporting a particular wireless protocol from an access point in accordance with various embodiments of the present disclosure.

FIG. 3B illustrates the example computing component 300 that can be configured to perform an operation to disassociate client devices supporting a particular wireless protocol from an access point in accordance with various embodiments of the present disclosure. FIG. 3B is a continuation of FIG. 3A. In particular, FIG. 3B expands steps associated with block 320 of FIG. 3A. As shown in FIG. 3B, at block 318, after the access point determines that the client devices currently connected to the access point support a particular wireless protocol (e.g., IEEE 802.11v or "802.11v"), the access point then generate a basic service set (BSS) transition request to be broadcasted to these client devices, at block 342. In general, a BSS transition request is a request made by an access point requesting or suggesting client devices connected to the access point to transition to a specific access point or a set of preferred access points. This BSS transition request can be generated by the access point when the access point tries to load balance or, in some cases, terminates a virtual network (e.g., a BSSID) provided by the access point. In this case, at block 342, the access point generates and broadcasts an unsolicited BSS transition request to the client devices supporting the particular wireless protocol. Included in the unsolicited BSS transition request is a disassociation flag indicating an intent of the access point to disassociate the client devices after a time period. This time period, in some embodiments, can be measured or indicated by a number of subsequent beacon frames sent by the access point to the client devices. For example, after setting the disassociation flag in the unsolicited BSS transition request, the access point can forcibly disassociated the client devices after 10 subsequent beacon frames. In some embodiments, the time period within with the client devices must disassociate from the access point is user configurable. For example, a network management entity can configure an access point to generate an unsolicited BSS transition request with a disassociation flag set for 20 subsequent beacon frames. Many variations are possible.

At block 344, after the access point generates the unsolicited BSS transition request requesting or suggesting the client devices to transition to other access points, the access point waits for a time period as indicated by the disassociation flag (e.g., after 10 subsequent beacon frames). Upon expiration of this time period, the access point initializes a counter, at block 346, to execute a loop (e.g., blocks 348-354) to identify and disassociate each of the client devices that remain connected to the access point. At block 348, the access point determines if any of the client devices remain connected to or associated with the access point. If no client devices are associated with the access point (e.g., "NO" branch), this means that the client devices have transitioned to other access points and the access point can proceed with the operational change, at block 312. If the client devices remain associated with the access point (e.g., "YES" branch), the access point, at block 350, generates another unsolicited BSS transition request requesting or suggesting the client devices to transition. This time, the unsolicited BSS transition request includes a list of neighboring access points to which the client devices may transition to. The list of neighboring access points, in some embodiments, can be obtained from the data store associated with the access point. The access point then, at block 352, increments the counter until all of the client devices that support the particular wireless protocol have transitioned to other neighboring access points. This loop will continue until the counter is greater than a threshold at which point the loop stops and the access point proceeds to block 322. The threshold, in some embodiments, can be a number of original client devices that support the particular wireless protocol. In some embodiments, the threshold can be a different number.

In general, operations performed by an access point as discussed with respect to FIGS. 3A and 3B describe an approach of gradually "nudging" client devices connected to the access point to transition to other access points before an operational change takes effect. For example, initially, the access point broadcasts an unsolicited BSS transition request to the client devices suggesting the client devices to transition to other access points. After the access point waits for some time (e.g., block 344 of FIG. 3B), if the client devices are still connected to the access point, the access point broadcasts another BSS transition request. This time, the BSS transition request includes a list of neighboring access points to which the client devices can transition to. The access point then checks whether or not each client device has transitioned to a neighboring access point (e.g., blocks 346-354 of FIG. 3B). After the access point checks whether or not each client device has transitioned to a neighboring access point, if there are still some client devices connected to the access point, the access point will eventually disassociate and deauthenticate these client devices and proceed with the operational change (e.g., blocks 322-328 of FIG. 3A). Therefore, the operations discussed with respect to FIGS. 3A and 3B provide a systematic approach of disassociating client devices from an access point by, initially, "gently nudging" the client devices to disassociate from the access point. If no response, "moderately nudging" the client devices to disassociate from the access point. If again no response, finally, disassociating the client devices from the access point. In the way, any network interruptions or disruptions that the client devices may experience during an access point operational change are minimized.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method for managing client devices on access points in accordance with various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the hardware processor(s) 402 may execute machine-readable/machine-executable instructions stored in the machine-readable storage media 404 to initiate an operational change of an access point. In some embodiments, the operational change can be planned. In other embodiments, the operation change can be unplanned.

At block 408, the hardware processor(s) 402 may execute machine-readable/machine-executable instructions stored in the machine-readable storage media 404 to generate an announcement to be included in a network frame based on the operational change. In some embodiments, the announcement can include at least a list of neighboring access points with which client devices connected to the access point can connect to and a first time period by which the client devices must connect to at least one neighboring access point included in the list of neighboring access points.

At block 410, the hardware processor(s) 402 may execute machine-readable/machine-executable instructions stored in the machine-readable storage media 404 to broadcast the network frame to the client device. In some embodiments, the network frame can be at least one of a management frame or a beacon frame.

At block 412, the hardware processor(s) 402 may execute machine-readable/machine-executable instructions stored in the machine-readable storage media 404 to disassociate, upon expiration of the first time period, client devices that remain connected to the access point.

Figure 5:
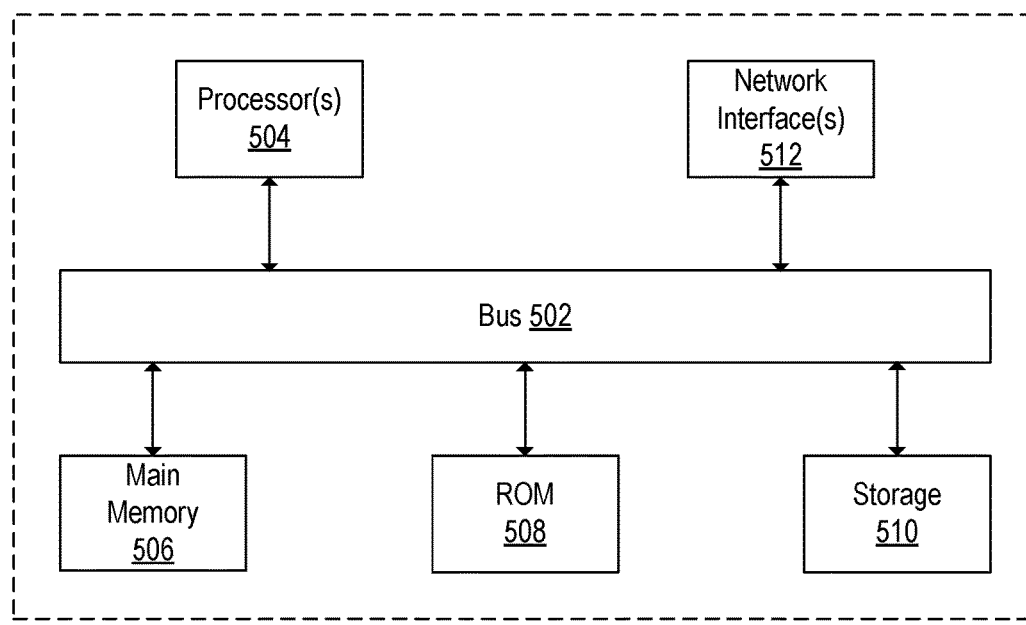
FIG. 5 illustrates a block diagram of an example computer system in which various embodiments of the present disclosure may be implemented.

FIG. 5 illustrates a block diagram of an example computer system 500 in which various embodiments of the present disclosure may be implemented. The computer system 500 can include a bus 502 or other communication mechanism for communicating information, one or more hardware processors 504 coupled with the bus 502 for processing information. The hardware processor(s) 504 may be, for example, one or more general purpose microprocessors. The computer system 500 may be an embodiment of an access point controller module, access point, or similar device.

The computer system 500 can also include a main memory 506, such as a random access memory (RAM), cache and/or other dynamic storage devices, coupled to the bus 502 for storing information and instructions to be executed by the hardware processor(s) 504. The main memory 506 may also be used for storing temporary variables or other intermediate information during execution of instructions by the hardware processor(s) 504. Such instructions, when stored in a storage media accessible to the hardware processor(s) 504, render the computer system 500 into a special-purpose machine that can be customized to perform the operations specified in the instructions.

The computer system 500 can further include a read only memory (ROM) 508 or other static storage device coupled to the bus 502 for storing static information and instructions for the hardware processor(s) 504. A storage device 510, such as a magnetic disk, optical disk, or USB thumb drive (Flash drive), etc., can be provided and coupled to the bus 502 for storing information and instructions.

Computer system 500 can further include at least one network interface 512, such as a network interface controller module (NIC), network adapter, or the like, or a combination thereof, coupled to the bus 502 for connecting the computer system 500 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 500, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques or technology described herein using customized hard-wired logic, one or more ASICs or FPGAs, firmware and/or program logic which in combination with the computer system 500 that causes or programs the computer system 500 to be a special-purpose machine. According to one or more embodiments, the techniques described herein are performed by the computer system 500 in response to the hardware processor(s) 504 executing one or more sequences of one or more instructions contained in the main memory 506. Such instructions may be read into the main memory 506 from another storage medium, such as the storage device 510. Execution of the sequences of instructions contained in the main memory 506 can cause the hardware processor(s) 504 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 510. The volatile media can include dynamic memory, such as the main memory 506. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 402. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of managing client devices on access points, the method comprising:
    initiating, by an access point, an operational change;
    generating, by the access point, an announcement to be included in a network frame based on the operational change, the announcement including at least a list of neighboring access points with which client devices connected to the access point can connect to and a first time period by which the client devices must connect to at least one neighboring access point included in the list of neighboring access points;
    broadcasting, by the access point, the network frame to the client devices; and
    disassociating, by the access point, upon expiration of the first time period, client devices that remain connected to the access point.

2. The computer-implemented method of claim 1, wherein the operational change is unplanned.

3. The computer-implemented method of claim 1, wherein the operational change is planned.

4. The computer-implemented method of claim 3, further comprising:
    preventing, by the access point, additional client devices from connecting to the access point; and
    determining, by the access point, wireless protocols supported by the client devices connected to the access point.

5. The computer-implemented method of claim 4, further comprising:
    determining, by the access point, that a subset of the client devices supports a particular wireless protocol;
    generating, by the access point, a request to be broadcasted to the subset of the client devices, the request including at least a disassociation flag indicating an intent of the access point to disassociate the subset of the client devices after a second time period;
    broadcasting, by the access point, the request to the subset of the client devices; and
    verifying, by the access point, that each client device of the subset of client devices has disassociated from the access point.

6. The computer-implemented method of claim 5, wherein the particular wireless protocol is IEEE 802.11v wireless protocol.

7. The computer-implemented method of claim 5, wherein the request is a basic service set transition request.

8. The computer-implemented method of claim 1, wherein the announcement is a channel switch announcement, wherein the channel switch announcement includes a new channel number field broadcast and the new channel number field is populated with an operating channel number of a neighboring access point.

9. The computer-implemented method of claim 1, wherein the network frame is at least one of a management frame or a beacon frame.

10. The computer-implemented method of claim 9, wherein the first time period is based on a number of management frames broadcasted to the client device subsequent to the network frame.

11. An access point comprising
    at least one processor; and
    a memory storing instructions that, when executed by the at least one processor, cause the access point to perform a method of managing client devices on access points, the method comprising:
    initiating an operational change;
    generating an announcement to be included in a network frame based on the operational change, the announcement including at least a list of neighboring access points with which client devices connected to the access point can connect to and a first time period by which the client devices must connect to at least one neighboring access point included in the list of neighboring access points;
    broadcasting the network frame to the client devices; and
    disassociating, upon expiration of the first time period, client devices that remain connected to the access point.

12. The access point of claim 11, wherein the operational change is planned.

13. The access point of claim 12, wherein the instructions, when executed, further cause the access point to perform:
    preventing additional client devices from connecting to the access point; and
    determining wireless protocols supported by the client devices connected to the access point.

14. The access point of claim 13, wherein the instructions, when executed, further cause the access point to perform:
    determining that a subset of the client devices supports a particular wireless protocol;
    generating a request to be broadcasted to the subset of the client devices, the request including at least a disassociation flag indicating an intent of the access point to disassociate the subset of the client devices after a second time period;
    broadcasting the request to the subset of the client devices; and
    verifying that each client device of the subset of client devices has disassociated from the access point.

15. The access point of claim 14, wherein the particular wireless protocol is IEEE 802.11v wireless protocol.

16. A non-transitory storage medium storing instructions that, when executed by at least one processor of an access point, cause the access point to perform a method of managing client devices on access points, the method comprising:

initiating an operational change;

generating an announcement to be included in a network frame based on the operational change, the announcement including at least a list of neighboring access points with which client devices connected to the access point can connect to and a first time period by which the client devices must connect to at least one neighboring access point included in the list of neighboring access points;

broadcasting the network frame to the client devices; and disassociating, upon expiration of the first time period, client devices that remain connected to the access point.

17. The non-transitory medium of claim 16, wherein the operational change is planned.

18. The non-transitory medium of claim 17, wherein the instructions, when executed, further cause the access point to perform:

preventing additional client devices from connecting to the access point; and determining wireless protocols supported by the client devices connected to the access point.

19. The non-transitory medium of claim 18, wherein the instructions, when executed, further cause the access point to perform:

determining that a subset of the client devices supports a particular wireless protocol;

generating a request to be broadcasted to the subset of the client devices, the request including at least a disassociation flag indicating an intent of the access point to disassociate the subset of the client devices after a second time period;

broadcasting the request to the subset of the client devices; and verifying that each client device of the subset of client devices has disassociated from the access point.

20. The non-transitory medium of claim 16, wherein the particular wireless protocol is IEEE 802.11v wireless protocol.

* * * * *